(12) United States Patent
Fujiwara et al.

(10) Patent No.: US 8,039,553 B2
(45) Date of Patent: Oct. 18, 2011

(54) PRESSURE-SENSITIVE ADHESIVE COMPOSITION

(75) Inventors: Masahiro Fujiwara, Kawasaki (JP); Yukinori Nakamichi, Oita (JP)

(73) Assignee: Japan Elastomer Co., Ltd., Tokyo (JP)

(*) Notice: Subject to any disclaimer, the term of this patent is extended or adjusted under 35 U.S.C. 154(b) by 506 days.

(21) Appl. No.: 11/571,909

(22) PCT Filed: Aug. 5, 2004

(86) PCT No.: PCT/JP2004/011255
§ 371 (c)(1), (2), (4) Date: Jan. 10, 2007

(87) PCT Pub. No.: WO2006/013631
PCT Pub. Date: Feb. 9, 2006

(65) Prior Publication Data
US 2008/0009587 A1   Jan. 10, 2008

(51) Int. Cl.
C08L 9/00 (2006.01)
C08L 47/00 (2006.01)
C08L 53/00 (2006.01)
C09J 7/02 (2006.01)

(52) U.S. Cl. .......................... 525/98; 524/505
(58) Field of Classification Search .............. 524/505; 525/98
See application file for complete search history.

(56) References Cited

U.S. PATENT DOCUMENTS

| | | | |
|---|---|---|---|
| 4,080,348 A | 3/1978 | Korpman | |
| 4,096,203 A | 6/1978 | St. Clair | |
| 4,136,071 A | 1/1979 | Korpman | |
| 5,089,550 A | 2/1992 | Sakagami et al. | |
| 5,342,685 A | 8/1994 | Gobran | |
| 5,583,182 A | 12/1996 | Asahara et al. | |
| 5,891,957 A | 4/1999 | Hansen et al. | |
| 5,948,527 A | 9/1999 | Gerard et al. | |
| 6,277,488 B1 | 8/2001 | Kobe et al. | |
| 2002/0077420 A1* | 6/2002 | Chiba et al. | 525/89 |
| 2002/0147274 A1* | 10/2002 | Sasagawa et al. | 525/98 |
| 2003/0166774 A1* | 9/2003 | Hoshi et al. | 525/88 |
| 2004/0077789 A1* | 4/2004 | Toda et al. | 525/89 |

FOREIGN PATENT DOCUMENTS

| | | |
|---|---|---|
| EP | 1 411 100 A1 | 4/2004 |
| JP | 52-140544 | 11/1977 |
| JP | 60-226580 | 11/1985 |
| JP | 61-278578 | 12/1986 |
| JP | 63-248817 | 10/1988 |
| JP | 3-026747 | 2/1991 |
| JP | 3-285978 | 12/1991 |
| JP | 5-093176 | 4/1993 |
| JP | 5-263056 | 10/1993 |
| JP | 6-107745 | 4/1994 |
| JP | 6-228522 | 8/1994 |
| JP | 7-506747 | 7/1995 |
| JP | 2000-309767 | 11/2000 |
| JP | 2001-271049 | 10/2001 |
| JP | 2004-238548 | 8/2004 |
| WO | 92/20725 | 11/1992 |
| WO | 97/10310 A1 | 3/1997 |
| WO | 02/057386 A | 7/2002 |
| WO | WO 03/060009 A1 * | 7/2003 |

OTHER PUBLICATIONS

English Language Abstract of JP 3-026747.
English Language Abstract of JP 5-263056.
English Language Abstract of JP 6-107745.
English Language Abstract of JP 52-140544.
English Language Abstract of JP 60-226580.
English Language Abstract of JP 5-093176.
English Language Abstract of JP 7-506747.
English Language Abstract of JP 6-228522.
English Language Abstract of JP 2004-238548.
English Language Abstract of JP 61-278578.
English Language Abstract of JP 63-248817.
English Language Abstract of JP 2001-271049.
English Language Abstract of JP 3-285978.
English Language Abstract of JP 2000-309767.

* cited by examiner

*Primary Examiner* — Mark Eashoo
*Assistant Examiner* — Angela C Scott
(74) *Attorney, Agent, or Firm* — Greenblum & Bernstein, PLC

(57) ABSTRACT

The present invention relates to an adhesive composition comprising (A) a block copolymer composition comprising a block copolymer (a) formed from at least two polymer blocks composed mainly of a monoalkenyl aromatic compound and at least one polymer block composed mainly of a conjugated diene compound and a block copolymer (b) formed from a polymer block composed mainly of a monoalkenyl aromatic compound and a polymer block composed mainly of a conjugated diene compound, wherein the block copolymer (a) has a GPC peak molecular weight of 60,000 to 110,000 in terms of standard polystyrene, the polymer block composed mainly of a monoalkenyl aromatic compound has a peak molecular weight of 10,000 to 30,000 and a molecular weight distribution Mw/Mn of 1.0 to 1.6, the block copolymer composition (A) has a content of the block copolymer (b) of 50 to 90% by weight, the block copolymer composition (A) has a total monoalkenyl aromatic compound content of more than 40% by weight and 50% by weight or less, the conjugated diene unit has a vinyl bond content of less than 20%, and the block copolymer composition (A) has a viscosity in a 15% toluene solution of 10 to 40 cP at 25° C.

13 Claims, No Drawings

PRESSURE-SENSITIVE ADHESIVE COMPOSITION

TECHNICAL FIELD

The present invention relates to an adhesive composition. More specifically, the present invention relates an adhesive composition having excellent low temperature processability and extremely excellent appearance, adhesive performances and heat resistance.

BACKGROUND ART

Recently, in view of energy saving, resource saving and reduction of environmental burdens, hot melt adhesives have been widely used. Block copolymers (SBS, SIS etc.) composed of a monoalkenyl aromatic compound and a conjugated diene compound are widely used as base polymers of such hot melt adhesives. However, in such adhesive compositions obtained by using these block copolymers, the balance of the holding power, tack properties and processability is insufficient, and their improvement has been desired. JP-A-61-278578 discloses, for example, an adhesive composition comprising a triblock copolymer and diblock copolymer as a method for improving the above properties. In addition, JP-A-63-248817 discloses an adhesive composition comprising a block copolymer obtained by coupling using a specific bifunctional coupling agent (specific dihalogen compound).
Patent Document 1: JP-A-61-278578
Patent Document 2: JP-A-63-248817

However, in recent years, properties required for hot melt adhesives have become more and more advanced and complicated. For example, adhesives used for sanitary goods such as disposable diapers and sanitary napkins are expected to have a wide range of properties such as transparency, heat discoloration resistance, deodorization and low viscosity in view of the appearance, sanitation and processability. Moreover, in response to the demand for improvement in the technique of coating of adhesives and the corresponding demand for increasing the productivity of final products, adhesive compositions need to have a low viscosity. Also, for retaining the strength of the object to be bonded, hot melt adhesives having excellent coatability at lower temperatures are in demand.

However, SBS, for example, generally has poor heat resistance because it contains a vinyl bond in the conjugated diene chain, and when the viscosity of the adhesive is reduced at high temperature so as to improve the processability, for example, heat discoloration, gelation or thermal decomposition may occur and impair the appearance of the adhesive composition, and adhesive performances may be deteriorated. On the other hand, when an adhesive composition is processed at low temperature to suppress such heat discoloration and heat degradation, processing is difficult due to high melt viscosity. Further, when taking processability into account, a method in which a large amount of a softener is added to improve the processability or a method in which the amount of addition of the block copolymer is reduced may be used. However, in these methods, the balance of adhesive performances may be deteriorated or bleeding of the softener may occur, often resulting in degradation of the appearance and sanitary properties of the adhesive composition. Moreover, although simple reduction of the molecular weight of SBS improves the heat discoloration or processability of the resulting adhesive, this is not preferred because adhesive performances are significantly deteriorated.

DISCLOSURE OF THE INVENTION

An object of the present invention is to solve such problems of conventional adhesive compositions and provide an adhesive composition having excellent low temperature processability and extremely excellent appearance, adhesive performances and heat resistance.

The present inventors have conducted intensive studies to solve the aforementioned problems and have found that a pressure-sensitive adhesive composition comprising a specific block copolymer composition composed of a monoalkenyl aromatic compound and a conjugated diene compound has extremely excellent low temperature processability which achieves the above object, and that completed the present invention.

Accordingly, the present invention provides the following pressure-sensitive adhesive composition, and the above object has been achieved.

An adhesive composition comprising (A) a block copolymer composition, the block copolymer composition (A) comprising:

a block copolymer (a) formed from at least two polymer blocks composed mainly of a monoalkenyl aromatic compound and at least one polymer block composed mainly of a conjugated diene compound and a block copolymer (b) formed from at least one polymer block composed mainly of a monoalkenyl aromatic compound and at least one polymer block composed mainly of a conjugated diene compound, wherein the block copolymer (a) has a peak molecular weight of 60,000 to 110,000 in terms of standard polystyrene measured by GPC, the polymer block composed mainly of a monoalkenyl aromatic compound, which constitutes the block copolymer composition (A), has a peak molecular weight of 1,0000 to 30,000 and a molecular weight distribution Mw/Mn of 1.0 to 1.6, the block copolymer composition (A) has a total monoalkenyl aromatic compound content of more than 40% by weight and 50% by weight or less, the block copolymer composition (A) has a content of the block copolymer (b) of 50 to 90% by weight, the conjugated diene unit in the block copolymer composition (A) has a vinyl bond content of less than 20%, and the block copolymer composition (A) has a viscosity in a 15% toluene solution of 10 to 40 cP at 25° C.

BEST MODE FOR CARRYING OUT THE INVENTION

The present invention is described in detail below.

The component (A) constituting the present invention is a block copolymer composition comprising a block copolymer (a) formed from at least two polymer blocks composed mainly of a monoalkenyl aromatic compound and at least one polymer block composed mainly of a conjugated diene compound and a block copolymer (b) formed from at least one polymer block composed mainly of a monoalkenyl aromatic compound and at least one polymer block composed mainly of a conjugated diene compound.

The polymer block composed mainly of a monoalkenyl aromatic compound means a homopolymer block consisting of a monoalkenyl aromatic compound or a copolymer block substantially composed of a monoalkenyl aromatic compound as a main component, which contains 50% by weight or more of a monoalkenyl aromatic compound. The polymer block composed mainly of a conjugated diene compound means a homopolymer block consisting of a conjugated diene compound or a copolymer block substantially composed of a conjugated diene compound as a main component, which contains 50% by weight or more of a conjugated diene compound. When the polymer block composed mainly of a conjugated diene compound is, for example, a copolymer of a monoalkenyl aromatic compound—a conjugated diene compound, the monoalkenyl aromatic compound in the copolymer block may be distributed homogeneously or non-homogeneously (e.g., in a tapered manner). In each block, a plurality of moieties in which the compound is homogeneously distributed and/or a plurality of moieties in which the compound is non-homogeneously distributed may be present together.

Examples of monoalkenyl aromatic compounds used for the block copolymers (a) and (b) include monomers such as styrene, p-methylstyrene, tertiary butylstyrene, α-methylstyrene and 1,1-diphenylethylene. Of these, styrene is preferred. These monomers may be used alone or in combination of two or more.

On the other hand, examples of conjugated diene compounds include monomers such as 1,3-butadiene, isoprene, 2,3-dimethyl-1,3-butadiene, 3-butyl-1,3-octadiene and phenyl-1,3-butadiene. Of these, 1,3-butadiene and isoprene are preferred, and 1,3-butadiene is most preferred. These monomers may be used alone or in combination of two or more.

The total bonded monoalkenyl aromatic compound content contained in the block copolymer composition (A) is more than 40% by weight in view of the productivity and the blocking resistance of the block copolymer composition and the holding power performance and the heat resistance of the resulting adhesive composition. The total content is 50% by weight or less in view of the tack properties of the resulting adhesive composition. Preferably, the total content is more than 40% by weight and 48% by weight or less.

The content of the block copolymer (b) constituting the block copolymer composition (A) in the present invention is 50% by weight or more in view of the adhesive performances of the resulting adhesive composition, such as melt viscosity and tack. The content is 90% by weight or less in view of the mechanical strength, rubber elasticity and blocking resistance of the resulting block copolymer composition and the holding power performance of the resulting adhesive composition. The content of the block copolymer (b) is preferably 55 to 85% by weight, more preferably 60 to 80% by weight.

In the present invention, preferably the content [b] of the block copolymer (b) constituting the block copolymer composition (A) satisfies the following formula in view of the productivity and the blocking resistance of the resulting block copolymer composition and the adhesive performances of the resulting adhesive composition, such as holding power performance and tack.

$$5[S]-175 \leq [b] \leq 5[S]-130$$

([S] means the total monoalkenyl aromatic compound content in the block copolymer composition (A).)

The block copolymer (a) has a peak molecular weight of 60,000 or more in terms of standard polystyrene in view of the rubber elastic properties and mechanical strength of the resulting block copolymer (A) and the holding power performance of the resulting adhesive composition. The block copolymer (a) has a peak molecular weight of 110,000 or less in terms of standard polystyrene in view of the melt viscosity, heat resistance, dispersibility and processability of the resulting adhesive composition. The peak molecular weight is preferably in the range of 65,000 to 105,000.

The polymer block composed mainly of a monoalkenyl aromatic compound, which constitutes the block copolymer composition, has a peak molecular weight of 10,000 or more in view of the holding power performance of the resulting adhesive composition, and 30,000 or less in view of the adhesive properties and melt viscosity at low temperatures. The peak molecular weight is preferably in the range of 10,000 to 25,000, and more preferably 12,000 to 23,000.

The polymer block composed mainly of a monoalkenyl aromatic compound, which constitutes the block copolymer composition, has a molecular weight distribution of 1.0 to 1.6 in view of the blocking resistance, adhesive force and holding power performance of the resulting adhesive composition. The molecular weight distribution is preferably in the range of 1.0 to 1.3, more preferably 1.0 to 1.2.

The conjugated diene unit of the block copolymer composition in the present invention has a vinyl bond content of less than 20% in view of the heat resistance, i.e., change in the melt viscosity upon heating and discoloration upon heating. The vinyl bond content is preferably in the range of less than 18%, more preferably less than 16%.

The block copolymer composition (A) in the present invention has a viscosity in a 15% toluene solution at 25° C. of 10 cP or more in view of the adhesive performances of the resulting adhesive composition, such as adhesive force and holding power, and 40 cP or less in view of the melt viscosity, processability and heat resistance of the resulting adhesive composition. The block copolymer composition (A) has a viscosity in a 15% toluene solution at 25° C. of preferably 12 to 35 cP, more preferably 15 to 32 cP.

The block copolymer composition (A) composed of the block copolymers (a) and (b), which constitutes the present invention is obtained by, for example, polymerizing styrene in an inert hydrocarbon solvent using an organic lithium compound as a polymerization initiator and then polymerizing the resulting polymer and butadiene, and in some cases, further repeating these procedures to separately form two styrene-butadiene block copolymers (a) and (b) and mixing the two. At that time, the molecular weight is adjusted by controlling the amount of the organic lithium compound. The composition (A) can be obtained by mixing the solutions of the block copolymers (a) and (b) after completion of the polymerization reaction and deactivating active species by adding water, alcohol or acid, or individually deactivating the solutions of the block copolymers (a) and (b) after completion of the polymerization reaction, mixing the resulting solutions, separating the polymerization solvent in the mixed solution by, for example, steam stripping and drying. Alternatively, the composition (A) can also be obtained by mixing, by a roll or the like, polymers obtained by individually removing the polymerization solvent from the solutions of the block copolymers (a) and (b) and drying.

The block copolymer composition (A) composed of the block copolymers (a) and (b), which constitutes the present invention, can also be obtained by a method different from the above method. Specifically, after polymerization of (b) component by the same method as described above, a copolymer product (a) component, is prepared by adding an appropriate coupling agent to the polymerization system in a predetermined amount based on the organic lithium compound, whereby a desired composition is obtained in the same reaction system. When this method is used, the molecular weights and the molecular weight distributions of the polymer blocks composed mainly of a monoalkenyl aromatic compound are exactly the same in the (a) component and the (b) component, and therefore the block copolymer composition has improved cohesive force and shows exceptionally excellent adhesive properties.

Also, in the block copolymer constituting the present invention, part or all of the unsaturated double bonds derived from conjugated diene may be hydrogenated. The method of hydrogenation is not particularly limited, and hydrogenation is performed by a known technique.

For the inert hydrocarbon solvent used in the present invention, hydrocarbon solvents of aliphatic hydrocarbons such as butane, pentane, hexane, isopentane, heptane, octane and isooctane, alicyclic hydrocarbons such as cyclopentane, methylcyclopentane, cyclohexane, methylcyclohexane and ethylcyclohexane and aromatic hydrocarbons such as benzene, toluene, ethylbenzene and xylene may be used. These solvents may be used not only alone but also in a mixture of two or more.

Examples of organic lithium compounds used in the present invention include known compounds such as ethyllithium, propyllithium, n-butyllithium, sec-butyllithium, tert-butyllithium, phenyllithium, propenyllithium and hexyllithium. Of these, n-butyllithium and sec-butyllithium are preferred. The organic lithium compounds are used not only alone but also in a mixture of two or more. The amount to be used is selected from the range in which a desired peak molecular weight can be obtained.

Also, in the block copolymers (a) and (b), when the polymer block composed mainly of a conjugated diene compound is a random copolymer block of a monoalkenyl aromatic compound and a conjugated diene compound, a method comprising polymerizing a monoalkenyl aromatic compound and then introducing and polymerizing a monoalkenyl aromatic compound and a conjugated diene compound simultaneously, or a method comprising simultaneously polymerizing part of the monoalkenyl aromatic compound and the conjugated diene compound and then additionally adding a conjugated diene compound are also used. Moreover, a polar compound may be added before starting polymerization and/or during polymerization reaction to control the chain distribution of the monoalkenyl aromatic compound. An ether, a tertiary amine, or the like, specifically, one member or a mixture of two or more selected from ethylene glycol dimethyl ether, tetrahydrofuran, α-methoxytetrahydrofuran and N,N,N',N'-tetramethylethylenediamine represents a polar compound available. Further, an alkali metal tertiary-alkoxide may also be used. Examples of the alkali metal tertiary-alkoxide include potassium-t-butoxide, potassium-t-amyl alkoxide, sodium-amyl alkoxide and potassium isopentyloxide.

To adjust the vinyl bond content in the conjugated diene compound in the block copolymers (a) and (b), an ether, a tertiary amine, or the like, specifically, one member or a mixture of two or more selected from ethylene glycol dimethyl ether, tetrahydrofuran, α-methoxytetrahydrofuran and N,N,N',N'-tetramethylethylenediamine are used. In particular, when high heat resistance is required, the vinyl bond content is preferably less than 20%.

When the block copolymer (a) constituting the present invention is obtained by a coupling reaction of the block copolymer (b), bifunctional epoxy compounds, alkoxysilicon compounds such as dimethyldimethoxysilane, dimethyldiethoxysilane, trimethoxymethylsilane, triethoxysilane, tetramethoxysilane and tetraethoxysilane, ester compounds such as methyl benzoate and ethyl benzoate, vinyl allenes such as divinylbenzene, halogenated silicon compounds such as dichlorodimethylsilane and phenylmethyldichlorosilane, tin compounds such as dichlorodimethyltin and tetrachlorotin, and silicon compounds such as tetrachlorosilane may be used as the coupling agent. Of these, in view of the adhesive performances, bifunctional coupling agents are preferably used. Further, in view of the heat discoloration of the adhesive composition, non-halogen type coupling agents are preferably used.

In the block copolymer constituting the present invention, the above coupling agent compounds may be used alone or in a mixture of two or more.

The component (B) that can be used for the adhesive composition of the present invention is selected from a broad range of compounds depending on the use and properties required for the resulting adhesive composition. Examples thereof include known tackifier resins such as coumarone resins, aromatic hydrocarbon resins, rosin resins, terpene resins, petroleum resins, phenol resins, terpene-phenol resins, alicyclic hydrocarbon resins, hydrogenated alicyclic hydrocarbon resins, hydrogenated terpene resins and hydrogenated rosin resins. These tackifier resins may be used in a mixture of two or more. When high heat discoloration resistance is required for the adhesive composition, tackifier resins in which unsaturated moieties are hydrogenated are preferred.

the tackifying resin used in the present invention is added in an amount of 20 to 600 parts by weight, preferably 50 to 400 parts by weight based on 100 parts by weight of the block copolymer in view of the tack properties, adhesive force and holding power performance of the resulting adhesive composition.

In the composition of the present invention, a softener ((C) component) can also be used. The type of the softener is not limited, and known paraffin or naphthene processing oils and mixed oils thereof can be used. When the color tone of the adhesive composition is considered important, paraffin oil is more preferred.

The softener is used in a range of amount from 0 to 300 parts by weight based on 100 parts by weight of the block copolymer in view of the holding power performance and appearance such as oil bleeding of the resulting adhesive composition.

An antioxidant may be added to the pressure-sensitive adhesive composition of the present invention according to need so as to further improve the heat stability and heat discoloration resistance of the composition. Examples of antioxidants include hindered phenol compounds such as 2,4-bis(n-octylthiomethyl)-O-cresol, 2,4-bis(n-dodecylthiomethyl)-O-cresol, 2,4-bis(phenylthiomethyl)-3-methyl-6-tert-butylpheniol, n-octadecyl-3-(3',5'-di-tert-butyl-4'-hydroxyphenyl)propionate, 2,2'-methylenebis(4-ethyl-6-tert-butylphenol), tetrakis-[methylene-3-(3',5'-di-tert-butyl-4'-hydroxyphenyl)propionate]-methane, 1,3,5-trimethyl-2,4,6-tris(3,5-di-tert-butyl-4-hydroxybenzyl)benzene, 2,6-di-tert-butyl-4-methylphenol, 2,6-di-tert-butyl-4-ethylphenol, 2-tert-butyl-6-(3-tert-butyl-2-hydroxy-5-methylbenzyl)-4-methylphenyl acrylate, 2,4-di-tert-amyl-6-[1-(3,5-di-tert-amyl-2-hydroxyphenyl)ethyl]phenyl acrylate, 2-[1-(2-hydroxy-3,5-di-tert-pentylphenyl)-ethyl]4,6-di-tert-pentylphenyl acrylate, and 3,9-bis[2-[3-(3-tert-butyl-4-hydroxy-5-methylphenyl)-propionyloxy]-1,1-dimethylethyl]-2,4,8,10-tetraoxaspiro[5,5]undecane, sulfur compounds such as pentaerythritol-tetrakis-(β-lauryl-thiopropionate), dilauryl-3,3'-thiodipropionate, dimyristyl-3,3'-thiodipropionate and distearyl-3,3'-thiodipropionate and phosphorous compounds such as tris(nonylphenyl)phosphite, cyclic neopentane tetraylbis(octadecyl phosphite) and tris(2,4-di-tert-butylphenyl)phosphite. These may be used alone or in a mixture of two or more. These compounds are added in any amount depending on the purpose of use, but they are used in an amount of preferably 5 parts by weight or less based on 100 parts by weight of the pressure-sensitive adhesive composition.

In addition, a light stabilizer may be used in the pressure-sensitive adhesive composition of the present invention. Examples of light stabilizers include benzotriazole compounds such as 2-(2'-hydroxy-5'-methylphenyl)benzotriazole, 2-(2'-hydroxy-5'-tert-octylphenyl)benzotriazole, 2-(2'-hydroxy-3',5'-di-tertbutylphenyl)benzotriazole, 2-(2'-hydroxy-3,5'-di-tert-butylphenyl)-5-chlorobenzotriazole and 2-(2'-hydroxy-3'-tert-butyl-5'-methylphenyl)-S-chlorobenzotriazole, hindered amine compounds such as bis(2,2,66-tetramethyl-4-piperidyl)sebacate, dimethyl succinate-1-(2-hydroxyethyl)-4-hydroxy-2,2,6,6-tetramethylpiperidine polycondensate and poly[(6-(1,1,3,3-tetramethylbutyl) imino-1,3,5-triazin-2,4-diyl)[2,2,6,6-tetramethyl-4-piperidyl]imino]hexamethylene[[2,2,6,6-tetramethyl-4-piperidyl]imino]], and benzophenone compounds such as 2-hydroxy-4-methoxybenzophenone.

The light resistance of the composition of the present invention can be further improved by combining such a benzotriazole compound, a hindered amine compound or a benzophenone compound with the composition.

In addition to the above stabilizers, pigments such as red iron oxide and titanium dioxide, waxes such as paraffin wax, microcrystalline wax and low molecular weight polyethylene wax, polyolefin or low molecular weight vinyl aromatic thermoplastic resins such as amorphous polyolefin and ethylene-ethyl acrylate copolymers, natural rubbers, and synthetic rubbers such as polyisoprene rubber, polybutadiene rubber, and synthetic rubbers such as styrene-butadiene rubber, ethylene-propylene rubber, chloroprene rubber, acrylic rubber, isoprene-isobutylene rubber, polypentenamer rubber, and synthetic rubbers such as styrene-butadiene block copolymers, styrene-isoprene block copolymers, hydrogenated styrene-butadiene block copolymers and hydrogenated styrene-isoprene block copolymers other than those in the present invention may be added to the pressure-sensitive adhesive composition of the present invention according to need.

The pressure-sensitive adhesive composition of the present invention is prepared by homogeneously mixing under heating using a known blender or kneader.

EXAMPLES

In the following, the present invention is described in detail with reference to Examples and Comparative Examples, but the present invention is not limited to these Examples. The measurements were performed in accordance with the following methods.

(A) Analysis of Block Copolymer

A-1) Total Styrene Content of Block Copolymer:

The total styrene content of the block copolymer was calculated by using a ultraviolet light spectrophotometer (UV200 manufactured by Hitachi, Ltd.) at an absorption intensity of 262 nm.

A-2) Vinyl Bond Content in Butadiene Unit:

The vinyl bond content in the butadiene unit was measured by using an infrared spectrophotometer (Model 1710 manufactured by PerkinEliner Inc.) based on Hampton technique (described in "*Analytical Chem.*, 21, 943('43)").

A-3) Peak Molecular Weight of Block Copolymer and Composition Ratio of Block Copolymer (a) to Block Copolymer (b):

From a chromatogram of GPC (an apparatus manufactured by Waters Corporation, three of MINIMIX manufactured by Polymer Laboratories Ltd. combined as columns, tetrahydrofuran used as the solvent under measurement conditions of a temperature of 35° C., a flow rate 0.4 ml/minute, a sample concentration of 0.1% by weight and an injection amount of 40 μl), the peak molecular weight and the composition ratio of block copolymers were determined. The peak molecular weight is a value converted based on the following standard polystyrene ($1.54 \times 10^6$, $4.1 \times 10^5$, $1.10 \times 10^5$, $3.5 \times 10^4$, $8.5 \times 10^3$, $1.8 \times 10^3$) calibration curve.

A-4) Peak Molecular Weight and Mw/Mn of Styrene Block Polymer:

A styrene polymer block obtained by an oxidative degradation method using osmium tetraoxide and t-butyl hydroperoxide [described in "*Journal of Polymer Science*" Vol. 1, p. 429 (1946)] was measured by GPC (an apparatus manufactured by Waters Corporation, Shodex-K803, K802, K801 manufactured by SHOWA DENKO K.K. combined as columns, chloroform used as a solvent under measurement conditions of a temperature of 35° C., a flow rate of 1.0 ml/minute, a sample concentration of 0.05% by weight and an injection amount of 100 μl).

A-5) Viscosity in 15% Toluene Solution:

The viscosity in a 15% toluene solution was measured by a Cannon-Fenske viscometer in a temperature controlled bath adjusted to 25° C.

A-6) Blocking Resistance:

For measuring the blocking resistance, a polyvinyl-chloride pipe with a diameter of 75 mm was filled with 300 g of a polymer composition to which 1000 ppm of ethylenebisstearylamide was added, and a load of 3 kg was applied thereto; after leavings at 50° C. for 24 hours, the load was removed and the composition was allowed to stand at room temperature for 1 hour, and the pipe was removed; thereafter, the cylindrical sample was compressed at a rate of 500 mm/minute with a TENSILON-UTM-III tensile tester (manufactured by TOYO SOKKI CO., Ltd.) and the load at break was measured.

(B) Measurement of Physical Properties of Adhesive Composition

For the measurement of physical properties of the adhesive composition, the composition in a molten state was applied to a polyester film in a thickness of 50 μm by an applicator to prepare an adhesive tape sample, and the tack, adhesive force and holding power were measured by the following methods.

B-1) Loop Tack

The loop tack was measured using a 250 mm long×15 mm wide loop sample at a contact area to a PE plate of 15 mm×50 mm for an adhesion time of 3 seconds at an adhesion and peeling rate of 500 mm/minute.

B-2) Adhesive Force:

A 25 mm wide sample was applied to a polyethylene plate and the 180° C. peeling force was measured at a peeling rate of 300 mm/minute.

B-3) Holding Power:

For measuring the holding power, the adhesive tape was applied to a stainless steel plate and a PE plate to make contact at an area of 25 mm×25 mm, and a load of 1 kg was applied at 60° C. and the time for the adhesive tape to fall off was measured.

B-4) Heat Discoloration Resistance of Pressure-Sensitive Adhesive Composition:

For measuring the heat discoloration resistance of the pressure-sensitive adhesive composition, the color tone was examined after heating in a gear oven at 180° C. for the time shown in Table 1.

B-5) Melt Viscosity of Pressure-Sensitive Adhesive Composition:

The melt viscosity of the pressure-sensitive adhesive composition was measured by a Brookfield viscometer at the temperature shown in Table 1.

B-6) Heat Resistance of Pressure-Sensitive Adhesive Composition (Change in Melt Viscosity):

The pressure-sensitive adhesive composition was put in a gear oven at 180° C. for the time shown in Table 1 and the melt viscosity was measured.

Example 1

The block copolymers used in Examples of the present invention were produced as follows.

A 40 L stainless steel reactor equipped with a jacket and a stirrer was thoroughly purged with nitrogen and charged with 17,600 g of cyclohexane, 4.8 g of tetrahydrofuran and 1470 g of styrene. The content was adjusted to about 55° C. by passing hot water through the jacket. Subsequently, an n-butyllithium cyclohexane solution (pure content 5.5 g) was added thereto to start polymerization of styrene. 3 minutes after styrene was almost completely polymerized, 1730 g of butadiene (1,3-butadiene) was added thereto to continue the polymerization. 4 minutes after butadiene was almost completely polymerized and the highest temperature reached about 90° C., 0.33 equivalent of a diglycidyl ether compound of bisphenol was added thereto as a coupling agent based on n-butyllithium to perform a coupling reaction. During the period immediately after the charge of styrene, the system was continuously stirred by the stirrer.

The resulting block copolymer solution was discharged and 20 g of water was added thereto and the mixture was stirred. Then, 3.2 g of n-octadecyl-3-(3',5'-di-tert-butyl-4-hydroxyphenyl)propionate and 1.0 g of 2,4-bis(n-octylthiomethyl)-O-cresol were added thereto. The resulting solution was subjected to steam stripping to remove the solvent, whereby water-containing crumbs were obtained. Then, the crumbs were dehydrated and dried to give a block copolymer composition sample.

100 g of the block copolymer composition thus obtained, 250 g of an alicyclic saturated hydrocarbon resin, ARKON M100 (manufactured by Arakawa Chemical Industries, Ltd., product name) which is a tackifying resin, 60 g of Diana Process Oil PW-90 (manufactured by Idemitsu Kosan, Co., Ltd., product name) which is a softener, and 1 g of Sumilizer GM (manufactured by Sumitomo Chemical Co., Ltd., product name) which is a stabilizer were mixed. The mixture was melted and kneaded at 180° C. for 2 hours in a 1 liter vessel equipped with a stirrer to give a hot melt adhesive composition.

Example 2

A block copolymer solution was obtained by polymerizing in the same manner as in Example 1 except that the amounts charged of styrene and butadiene (1,3-butadiene) and the amount added of the n-butyllithium cyclohexane solution were changed. 4 minutes after butadiene was almost completely polymerized and the temperature reached the highest, 0.28 equivalent of dimethoxydimethylsilane was added to the solution as a coupling agent based on the n-butyllithium to perform a coupling reaction. The system was continuously stirred by the stirrer during the reaction. The solvent was removed from the resulting block copolymer solution and the resultant was dried by the same method as in Example 1 to give a block copolymer composition, and mixing was performed in the same manner as in Example 1, whereby a hot melt adhesive composition was obtained.

Example 3

A 40 L stainless steel reactor equipped with a jacket and a stirrer was thoroughly purged with nitrogen and charged with 17,600 g of cyclohexane, 4.8 g of tetrahydrofuran and 685 g of styrene. The content was adjusted to about 55° C. by passing hot water through the jacket. Subsequently, an n-butyllithium cyclohexane solution (pure content 2.9 g) was added thereto to start polymerization of styrene. 3 minutes after styrene was almost completely polymerized, 1830 g of butadiene (1,3-butadiene) was added thereto to continue the polymerization. 4 minutes after butadiene was almost completely polymerized, 685 g of styrene was added thereto to complete the polymerization, whereby a block copolymer (a) was obtained. During the period, the system was continuously stirred by the stirrer. The resulting block copolymer (a) solution was discharged and 20 g of water was added thereto and the mixture was stirred. Then, 3.2 g of n-octadecyl-3-(3', 5'-di-tert-butyl-4'-hydroxyphenyl)propionate and 110 g of 2,4-bis(n-octylthiomethyl)-O-cresol were added thereto. Also, a 40 L stainless steel reactor equipped with a jacket and a stirrer was thoroughly purged with nitrogen and charged with 17,600 g of cyclohexane, 4.8 g of tetrahydrofuran and 1370 g of styrene. The content was adjusted to about 55° C. by passing hot water through the jacket. Subsequently, an n-butyllithium cyclohexane solution (pure content 5.8 g) was added thereto to start polymerization of styrene. 3 minutes after styrene was almost completely polymerized, 1830 g of butadiene (1,3-butadiene) was added thereto to complete the polymerization, whereby a block copolymer (b) was obtained. During the period, the system was continuously stirred by the stirrer. The resulting block copolymer (b) solution was discharged and 20 g of water was added thereto and the mixture was stirred. Then, 3.2 g of n-octadecyl-3-(3',5'-di-tert-butyl-4'-hydroxyphenyl)propionate and 1.0 g of 2,4-bis(n-octylthiomethyl)-O-cresol were added thereto.

Then, the block copolymer (a) solution and the block copolymer (b) solution were mixed at 33/67. The solvent was removed from the resulting block copolymer composition solution and the resultant was dried by the same method as in Example 1 to give a block copolymer composition, and mixing was performed in the same manner as in Example 1, whereby a hot melt adhesive composition was obtained.

Comparative Example 1

A block copolymer solution was obtained by polymerizing in the same manner as in Example 1 except that the amounts charged of styrene and butadiene (1,3-butadiene) and the amount added of the n-butyllithium cyclohexane solution were changed. 4 minutes after butadiene was almost completely polymerized and the temperature reached the highest, 0.35 equivalent of dimethoxydimethylsilane was added to the solution as a coupling agent based on n-butyllithium to perform a coupling reaction. During the period immediately after the charge of styrene, the system was continuously stirred by the stirrer. The solvent was removed from the resulting block copolymer solution and the resultant was dried by the same method as in Example 1 to give a block copolymer composition, and mixing was performed in the same manner as in Example 1, whereby a hot melt adhesive composition was obtained.

Comparative Example 2

A block copolymer solution was obtained by polymerizing in the same manner as in Example 1 except that the amounts charged of styrene and butadiene (1,3-butadiene) and the amount added of the n-butyllithium cyclohexane solution were changed. 4 minutes after butadiene was almost completely polymerized and the temperature reached the highest, 0.64 equivalent of a diglycidyl ether compound of bisphenol was added to the solution as a coupling agent based on n-butyllithium to perform a coupling reaction. The system was continuously stirred during the reaction. The solvent was removed from the resulting block copolymer solution and the resultant was dried by the same method as in Example 1 to give a block copolymer composition, and mixing was performed in the same manner as in Example 1, whereby a hot melt adhesive composition was obtained.

Comparative Example 3

A 40 L stainless steel reactor equipped with a jacket and a stirrer was thoroughly purged with nitrogen and charged with 17,600 g of cyclohexane, 4.8 g of tetrahydrofuran and 970 g of styrene. The content was adjusted to about 55° C. by passing hot water through the jacket Subsequently, an n-butyllithium cyclohexane solution (pure content 6.7 g) was added thereto to start polymerization of styrene. 3 minutes after styrene was almost completely polymerized, 1890 g of butadiene (1,3-butadiene) and 240 g of styrene were added thereto to continue the polymerization. 4 minutes after polymerization was almost completed and the temperature reached the highest, 0.27 equivalent of dimethoxydimethylsilane was added thereto as a coupling agent based on n-butyllithium to perform a coupling reaction. During the period, the system was continuously stirred by the stirrer. The solvent was removed from the resulting block copolymer solution and the resultant was dried by the same method as in Example 1 to give a block copolymer composition, and mixing was performed in the same manner as in Example 1, whereby a hot melt adhesive composition was obtained.

Comparative Example 4

A block copolymer solution was obtained by polymerizing in the same manner as in Example 1 except that the amounts charged of styrene and butadiene (1,3-butadiene) and the amount added of the n-butyllithium cyclohexane solution were changed. 4 minutes after butadiene was almost completely polymerized and the temperature reached the highest, 0.23 equivalent of a diglycidyl ether compound of bisphenol was added to the solution as a coupling agent based on n-butyllithium to perform a coupling reaction. During the period, the system was continuously stirred by the stirrer. The solvent was removed from the resulting block copolymer solution and the resultant was dried by the same method as in Example 1 to give a block copolymer composition, and mixing was performed in the same manner as in Example 1, whereby a hot melt adhesive composition was obtained.

Comparative Example 5

A 40 L stainless steel reactor equipped with a jacket and a stirrer was thoroughly purged with nitrogen and charged with 17,600 g of cyclohexane, 4.8 g of tetrahydrofuran, 1.66 g of N,N,N',N'-tetramethylethylenediamine and 1340 g of styrene. The content was adjusted to about 55° C. by passing hot water through the jacket. Subsequently, an n-butyllithium cyclohexane solution (pure content 5.1 g) was added thereto to start polymerization of styrene. 3 minutes after styrene was almost completely polymerized, 1860 g of butadiene (1,3-butadiene) was added thereto to continue the polymerization. 4 minutes after butadiene was almost completely polymerized and the highest temperature reached about 90° C., 0.33 equivalent of a diglycidyl ether compound of bisphenol was added thereto as a coupling agent based on n-butyllithium to perform a coupling reaction. During the period immediately after the charge of styrene, the system was continuously stirred by the stirrer. The solvent was removed from the resulting block copolymer solution and the resultant was dried by the same method as in Example 1 to give a block copolymer composition, and mixing was performed in the same manner as in Example 1, whereby a hot melt adhesive composition was obtained.

REFERENCE EXAMPLE

A block copolymer solution was obtained by polymerizing in the same manner as in Example 1 except that the amounts charged of styrene and butadiene (1,3-butadiene) and the amount added of the n-butyllithium cyclohexane solution were changed, 4 minutes after butadiene was almost completely polymerized and the temperature reached the highest, 0.4 equivalent of dimethyldichlorosilane was added to the solution as a coupling agent based on n-butyllithium to perform a coupling reaction. During the period, the system was continuously stirred by the stirrer. The solvent was removed from the resulting block copolymer solution and the resultant was dried by the same method as in Example 1 to give a block copolymer composition, and mixing was performed in the same manner as in Example 1, whereby a hot melt adhesive composition was obtained.

The structure of the block copolymer compositions obtained and physical properties of the adhesive compositions obtained by mixing the same are shown in Table 1. It has been found that use a block copolymer composition having a specific structure specified in the present invention, which is excellent in handling properties, makes it possible to obtain an adhesive composition having low melt viscosity, excellent low temperature processability, excellent balance of adhesive performances, in particular, holding power, and extremely excellent heat resistance.

TABLE 1

| | Example 1 | Example 2 | Example 3 | Comparative Example 1 | Comparative Example 2 | Comparative Example 3 | Comparative Example 4 | Comparative Example 5 | Reference Example |
|---|---|---|---|---|---|---|---|---|---|
| Block copolymer composition | | | | | | | | | |
| Styrene content (% by weight) | 46 | 44 | 43 | 35 | 42 | 41 | 43 | 42 | 44 |
| 15% TV (cP) | 22 | 30 | 20 | 50 | 35 | 21 | 32 | 28 | 28 |
| Peak molecular weight (ten thousand) Block copolymer (a) | 10.0 | 10.1 | 9.0 | 14.2 | 8.7 | 7.5 | 13.1 | 9.8 | 9.4 |

TABLE 1-continued

| | Example 1 | Example 2 | Example 3 | Comparative Example 1 | Comparative Example 2 | Comparative Example 3 | Comparative Example 4 | Comparative Example 5 | Reference Example |
|---|---|---|---|---|---|---|---|---|---|
| Composition ratio of block copolymer (b) in block copolymer composition | 72 | 75 | 67 | 70 | 40 | 77 | 80 | 70 | 63 |
| Block styrene molecular weight (ten thousand) | | | | | | | | | |
| Block copolymer (a) | 1.8 | 1.75 | 1.6 | 1.9 | 1.4 | 0.85 | 2.0 | 1.6 | 1.6 |
| Block copolymer (b) | 1.8 | 1.75 | 1.5 | 1.9 | 1.4 | 0.85 | 2.0 | 1.6 | 1.6 |
| Mw/Mn of block styrene | | | | | | | | | |
| Block copolymer (a) | 1.11 | 1.09 | 1.18 | 1.13 | 1.11 | 1.09 | 1.12 | 1.08 | 1.11 |
| Block copolymer (b) | 1.11 | 1.09 | 1.10 | 1.13 | 1.11 | 1.09 | 1.12 | 1.08 | 1.11 |
| Vinyl bond content (%) | 14 | 14 | 14 | 14 | 14 | 14 | 14 | 25 | 14 |
| Type of coupling agent | *2. Epoxy compound | Dimethoxydi methylsilane | — | Dimethoxydi methylsilane | *2. Epoxy compound | Dimethoxydi methylsilane | *2. Epoxy compound | *2. Epoxy compound | Dimethyldic hlorosilane |
| Blocking resistance (kg) | 1.5 | 2.1 | 2.0 | 4.8 | * 1.F.F | 3.7 | 3.4 | 2.2 | 1.9 |
| Physical properties of pressure-sensitive adhesive composition | | | | | | | | | |
| Melt viscosity (cP) | | | | | | | | | |
| 140° C. | 2400 | 2850 | 2200 | 4800 | 3420 | 1980 | 3310 | 2770 | 2750 |
| 160° C. | 1160 | 1310 | 1020 | 2210 | 1670 | 920 | 1520 | 1300 | 1260 |
| 180° C. | 590 | 690 | 540 | 1130 | 790 | 470 | 810 | 720 | 670 |
| Loop tack (gf) | 290 | 410 | 340 | 560 | 210 | 530 | 470 | 380 | 290 |
| Adhesive force (gf/10 mm) | 1250 | 1280 | 1190 | 1300 | 780 | 980 | 1260 | 1270 | 1210 |
| Holding power (min) | 16.7 | 17.0 | 14.7 | 19.1 | 21.5 | 10.1 | 17.8 | 15.8 | 17.2 |
| Heat discoloration | | | | | | | | | |
| 0 hr | Colorless | Colorless | Colorless | Colorless | Colorless | Colorless | Colorless | Colorless | Light brown |
| 24 hr | Light yellow | Light yellow | Light yellow | Light yellow | Light yellow | Light yellow | Light yellow | Light yellow | Brown |
| 48 hr | Light yellow | Light yellow | Light yellow | Yellow | Yellow | Light yellow | Yellow | Yellow | Dark brown |
| Change in melt viscosity upon heating | | | | | | | | | |
| 0 hr | 590 | 690 | 540 | 1130 | 790 | 470 | 810 | 720 | 670 |
| 24 hr | 580 | 680 | 520 | 1620 | 960 | 480 | 980 | 970 | 670 |
| 48 hr | 590 | 730 | 560 | 3140 | 1210 | 480 | 1320 | 1520 | 720 |

* 1.F.F.: broken without load when compressed in measurement of blocking resistance
*2. epoxy coupling agent: diglycidyl ether compound of bisphenol (n0 type 98% or more) mixture of the following structural formulas 1 and 2 at 1:1

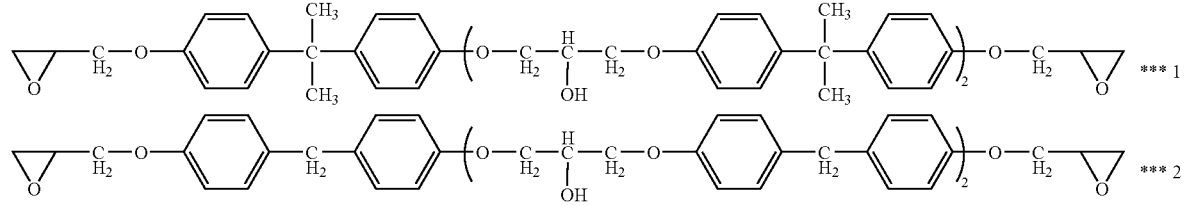

Although the present invention has been described in detail and with reference to specific embodiments thereof, it will be apparent to one skilled in the art that various changes and modifications may be made therein without departing from the spirit and scope of the invention.

The present application is based on Japanese Patent Application No. 2003-030484 filed on Feb. 7, 2003 and the contents thereof is incorporated herein by reference.

INDUSTRIAL APPLICABILITY

The present invention solves the problems with conventional adhesive compositions and in particular, makes it possible to provide an adhesive composition easily processable at low temperatures and having extremely excellent appearance, adhesive performances and heat resistance.

The invention claimed is:
1. An adhesive composition comprising (A) a block copolymer composition, the block copolymer composition (A) comprising:
a block copolymer (a) formed from at least two polymer blocks composed mainly of a styrene and at least one polymer block composed mainly of a conjugated diene compound and a block copolymer (b) formed from at least one polymer block composed mainly of a styrene and at least one polymer block composed mainly of a conjugated diene compound, wherein the block copolymer (a) has a peak molecular weight of 60,000 to 110,000 in terms of standard polystyrene as measured by GPC, all of the polymer blocks composed mainly of a styrene, which constitutes the block copolymer composition (A), have a peak molecular weight of 10,000 to 30,000 and a molecular weight distribution Mw/Mn of 1.0 to 1.6, the block copolymer composition (A) has a total styrene content of more than 40% by weight and 50% by weight or less, the block copolymer composition (A) has a content of the block copolymer (b) of 50 to 90% by weight, the conjugated diene unit in the block copolymer composition (A) has a vinyl bond content of less than 20%, and the block copolymer composition (A) has a viscosity in a 15% toluene solution of 10 to 40 cP at 25° C.

2. The adhesive composition according to claim 1, wherein the block copolymer composition (A) has a content of the block copolymer (b) of 55 to 85% by weight.

3. The adhesive composition according to claim 2, wherein the polymer block composed mainly of a styrene, which constitutes the block copolymer composition (A), has a molecular weight distribution Mw/Mn of 1.0 to 1.2.

4. The adhesive composition according to claim 2, wherein the conjugated diene compound is butadiene.

5. The adhesive composition according to claim 1, wherein the block copolymer composition (A) has a content of the block copolymer (b) of 60 to 80% by weight.

6. The adhesive composition according to claim 5, wherein the polymer block composed mainly of a styrene, which constitutes the block copolymer composition (A), has a molecular weight distribution Mw/Mn of 1.0 to 1.2.

7. The adhesive composition according to claim 5, wherein the conjugated diene compound is butadiene.

8. The adhesive composition according to claim 1, wherein the polymer block composed mainly of a styrene, which constitutes the block copolymer composition (A), has a molecular weight distribution Mw/Mn of 1.0 to 1.2.

9. The adhesive composition according to claim 1, wherein the conjugated diene compound is butadiene.

10. The adhesive composition according to claim 1, further comprising (B) 20 to 600 parts by weight of a tackifying resin and (C) 1 to 300 parts by weight of a softener based on 100 parts by weight of the block copolymer composition (A).

11. A process for producing the adhesive composition according to claim 1, comprising:
    obtaining the block copolymer (a) by a coupling reaction of the block copolymer (b) using a non-halogen type coupling agent.

12. A process for producing the adhesive composition according to claim 2, comprising:
    obtaining the block copolymer (a) by a coupling reaction of the block copolymer (b) using a non-halogen type coupling agent.

13. A process for producing the adhesive composition according to claim 5, comprising:
    obtaining the block copolymer (a) by a coupling reaction of the block copolymer (b) using a non-halogen type coupling agent.

* * * * *